This invention relates to the stabilization of catechol amines such as epinephrine, arterenol and nordefrin. Since the invention has its primary application in the stabilization of epinephrine, the invention is described in this connection.

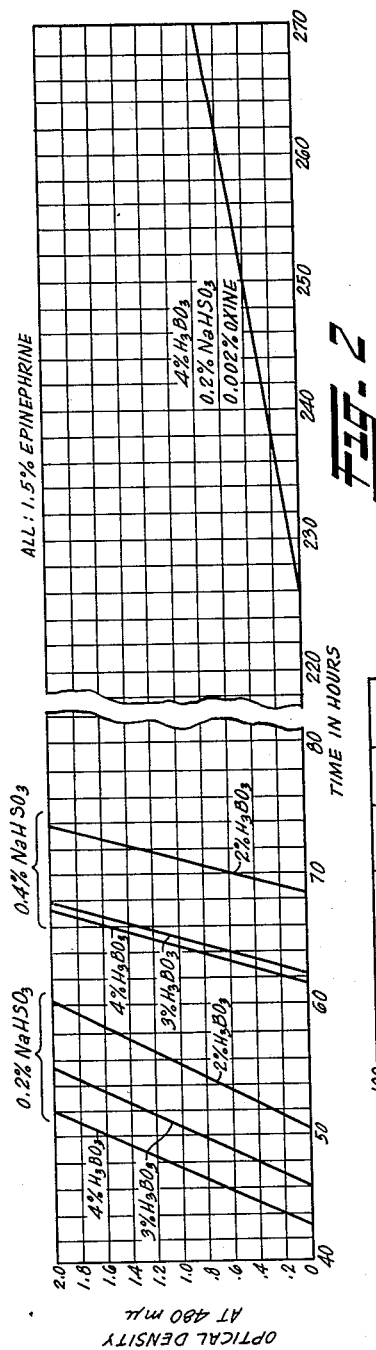
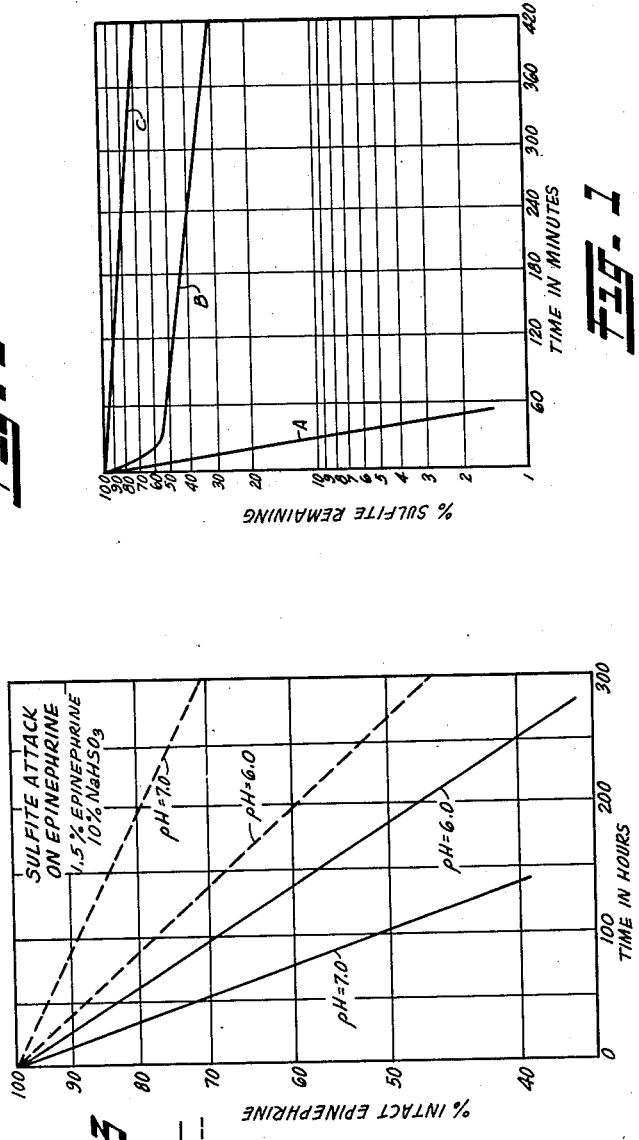
INVENTOR:—
SIDNEY RIEGELMAN
BY
ATTORNEYS

# 3,149,035
STABILIZATION OF EPINEPHRINE
Sidney Riegelman, San Francisco, Calif., assignor to The Regents of the University of California
Filed Apr. 28, 1961, Ser. No. 106,237
4 Claims. (Cl. 167—65)

Epinephrine finds wide application in medicine. As an example, it has been found that epinephrine is an effective antiglaucoma drug. Interest in the use of this compound for the treatment of glaucoma has been increasing in recent years, but the drug in the form heretofore available suffers from two defects. In the first place, epinephrine is unstable to air and light and is subject to direct chemical attack. This problem has partially been solved by the provision of acid solutions of epinephrine, usually around pH 3.5, but this introduces the second problem. Such acid solutions are extremely irritating to the eye of the patient; the use of such solutions is roughly the equivalent of applying vinegar to the eyes. If an attempt is made to bring the pH of these solutions into the physiological pH range, i.e. 6.5–8.5, the free epinephrine precipitates and deterioration rapidly ensues. In order to retard the onset of oxidative deterioration when open, the solution usually contains sodium bisulfite which is considered to be the best available anti-oxidant. However, the sodium bisulfite attacks the side chain of the epinephrine molecule during storage in a closed bottle, forming an inactive colorless derivative.

In accordance with the present invention, a stable solution of epinephrine is prepared which can be adjusted to the physiological range without precipitation of the free base, without significant bisulfite attack on the side chain, and with greatly extended stability to oxidation in the presence of air and light. At the same time, the compound so stabilized has been found to maintain its effectiveness in the treatment of glaucoma, i.e. the ability to lower intraocular pressure.

Generally speaking, it has been found that epinephrine solutions having a physiological pH and which are stable for months in storage can be prepared by combining with the epinephrine a small amount of sodium bisulfite, boric acid, and oxine (8-hydroxy-quinoline) hereinafter called 8-quinolinol and adjusting the pH with an alkali, such as sodium hydroxide, to the desired pH.

The three figures of the drawing are graphs showing the effects of the various ingredients on epinephrine solutions.

FIGURE 1 illustrates the effect of 8-quinolinol in preventing the development of acidity and/or the destruction of sodium bisulfite of solutions containing sodium bisulfite. Three solutions were made, each containing 1.5% epinephrine. Solution A contained in addition 2% boric acid and 0.1% sodium bisulfite. Solution B contained 1.5% epinephrine and 0.1% sodium bisulfite. Solution C contained 1.5% epinephrine, 0.1% sodium bisulfite and 0.01% 8-quinolinol. Each of the solutions was adjusted to a pH of 7.0 with NaOH. It will be observed that solution A very rapidly lost its sodium bisulfite content; only 8 or 9 minutes were required to oxidize half of the bisulfite but it still had the same pH of 7.0. Solution B lost its sodium bisulfite much more slowly and in fact required 875 minutes to lose half of the bisulfite content. However, upon losing half of the bisulfite content, the pH had dropped to 4.5. In contrast, solution C, which contained the 8-quinolinol and the sodium bisulfite, was not only the most stable, requiring over 1000 minutes to lose half of the bisulfite content, but the pH of the solution remained unchanged throughout. Thus, the 8-quinolinol not only prevents the development of acidity but also protects the sodium bisulfite so that it can continue to function as an effective anti-oxidant.

In FIGURE 2, the effect of the addition of 8-quinolinol is shown. In the first family of curves on the left of the graph, stabilities are shown for solutions containing 0.2% sodium bisulfite, 1.5% epinephrine and 2, 3 or 4% boric acid. In this case, the standard used was the optical density at 480 m$\mu$., it being known that the optical density at this wave length increases with the destruction of epinephrine, i.e. the red color which appears in these solutions is due to the formation of the epinephrine oxidation product adrenochrome. The onset of the coloration indicates the total destruction of the anti-oxidant. Here it will be seen that stabilities of only 40 to 50 hours were obtained before epinephrine oxidation began. Further, it will be observed that the increase in boric acid merely served to shorten the induction period but that once epinephrine oxidation had started, the increase was at substantially the same rate regardless of the percentage of boric acid present. The second family of curves is substantially the same except that here 0.4% of sodium bisulfite was used in place of 0.2%. Although the time for the onset of the red color was slightly increased, doubling the amount of the bisulfite does not result in an increase proportional to concentration. The last curve on the right shows the startling effect which is attained by the addition of 0.02% 8-quinolinol to the worst of the previously described solutions, i.e. the solution containing 4% boric acid and 0.2% sodium bisulfite. Here it will be seen that red color did not start to develop until about 225 hours showing that 8-quinolinol stabilizes the bisulfite towards oxidation and that once started, the rate of oxidation of the epinephrine proceeded at a much lower rate than any of the previously described solutions.

In FIGURE 3, there is shown the difference in the bisulfite attack on epinephrine in the absence of oxygen, depending upon whether or not boric acid is also present in the solution. Solutions were made up containing 1.5% epinephine, 10% sodium bisulfite, and the pH's of the solutions were adjusted to 6 and 7. Some of the samples contained no boric acid, while others contained 2% boric acid. Comparing the curves for pH 6, it will be noted that there was some improvement when boric acid was used. For instance, without boric acid 50% of the epinephrine had been destroyed in 195 hours, while with boric acid it required 267 hours in storage at room temperature to destroy 50% of the epinephrine. At a pH of 7, the difference is even more startling. It can be seen that when no boric acid is present, 50% of the epinephrine is destroyed at slightly over 100 hours, while with the boric acid, it required 455 hours of storage before 50% was destroyed. Thus, boric acid definitely prevents the sulfite attack on the side chain of epinephrine and is even more effective in preventing the attack at high pH's.

Preferred solutions made in accordance with the present invention are illustrated by the following non-limiting examples (all parts by weight):

Example I

| | Percent |
|---|---|
| Epinephrine U.S.P. | 1.2 |
| Boric acid | 2 |
| Sodium bisulfite | 0.4 |
| 8-quinolinol | 0.01 |

Solution adjusted to pH 7.4 by the addition of sodium hydroxide.

Example II

| | Percent |
|---|---|
| Arterenol | 0.5 |
| Boric acid | 1 |
| Sodium bisulfite | 0.3 |
| 8-quinolinol | 0.01 |

Solution adjusted to pH 6.8 by the addition of sodium hydroxide.

Example III

| | |
|---|---|
| Epinephrine U.S.P. | 2 |
| Boric acid | 4 |
| Sodium bisulfite | 0.5 |
| 8-quinolinol | 0.02 |

Solution adjusted to pH of 7.0 by the addition of sodium hydroxide.

Example IV

| | |
|---|---|
| Epinephrine U.S.P. | 0.1 |
| Boric acid | 0.5 |
| Sodium bisulfite | 0.3 |
| 8-quinolinol | 0.005 |

Solution adjusted to pH of 8.5 by the addition of sodium hydroxide.

Such solutions have been found to be stable for many months in storage, and, even after opening, will remain stable and effective in the treatment of glaucoma for weeks.

Another advantage of the use of 8-quinolinol in the present solution is that it functions as an effective antibactericidal agent. Thus, solutions can be made without the addition of such agents which have heretofore been thought necessary. Although not ordinarily necessary, it has been found that the solutions of the present invention may be autoclaved without the destruction of the epinephrine.

Although the above examples are preferred embodiments of the invention, stable epinephrine solutions can be prepared by departing considerably from these examples. It has been found that from 0.001 to 0.1% of 8-quinolinol can be used. From 0.2% to 5% boric acid may be used. The amount of sodium bisulfite can be varied from 0.1% to 1%. The solutions can contain from 0.1 to 4% epinephrine. The pH's of the solutions can be adjusted to any value within the physiological range, i.e. from 6.5–8.5 using any convenient alkali such as sodium hydroxide.

I claim:

1. A stable solution of a catechol amine comprising an aqueous solution of the catechol amine with 8-quinolinol, boric acid, and sodium bisulfite said solution containing from 0.1 to 4% of the catechol amine; from 0.001 to 0.1% 8-quinolinol; from 0.2 to 5% boric acid; from 0.1 to 1% sodium bisulfite, the balance of said solution consisting essentially of water, said solution being adjusted to a pH of 6.5–8.5.

2. The solution of claim 1 wherein the catechol amine is epinephrine.

3. A stable solution of epinephrine comprising in combination from 0.1 to 4% epinephrine, from 0.001 to 0.1% 8-quinolinol, from 0.2 to 5% boric acid and from 0.1 to 1% sodium bisulfite, all parts being by weight, the balance of said solution consisting essentially of water, said solution being adjusted to a pH of from 6.5–8.5.

4. A stable solution of epinephrine containing the following: epinephrine 1.2%; boric acid 2%; sodium bisulfite 0.4%; and 8-quinolinol 0.01% the balance of said solution consisting essentially of water and having a pH of about 7.4.

References Cited in the file of this patent

UNITED STATES PATENTS

| | | |
|---|---|---|
| 2,382,546 | Curtis | Aug. 14, 1945 |
| 2,391,552 | Curtis | Dec. 25, 1945 |
| 2,493,471 | Tillitson | June 4, 1945 |
| 2,783,132 | Panepinto | Feb. 26, 1957 |
| 2,948,680 | Fields | Aug. 9, 1960 |

FOREIGN PATENTS

| | | |
|---|---|---|
| 111,256 | Australia | Aug. 22, 1940 |

OTHER REFERENCES

Bernheim et al.: "Catalytic Action of 8-Hydroxyquinoline on the Oxidation of p-Phenylenediamine," J. Am. Chem. Soc. 62,984 (1940).

Raymond-Hamet: "Sympathiocolytic Properties of Isoquinoline, Quinoline, +8-Hydroxyquinoline," Compt. Rend. Soc. Biol. 136, pp. 713–714 (1942).

Mörch et al.: "Stability of Eye-Drops of Resorcinol," Dansk Tidsskr. Farm. 32, 62–74 (1958), per Chem. Abstracts 52, #10502b. (Abstract in P.O.S.L.)

Moews et al.: "Auto-Oxidation of Hydroxylamine," J. Inorg. and Nuclear Chem. 11, 242–246 (1959).

Higuchi et al.: "Reactivity of Bisulfite With a Number of Pharmaceuticals," J. Am. Pharm. Ass'n, Sci. Ed., vol. XLVIII. No. 9, September 1959, pp. 535–540.